United States Patent [19]
Weatherford et al.

[11] Patent Number: 4,942,518
[45] Date of Patent: Jul. 17, 1990

[54] CACHE STORE BYPASS FOR COMPUTER

[75] Inventors: James R. Weatherford, Lake Dallas; Arthur T. Kimmel; Steven J. Wallach, both of Dallas, all of Tex.

[73] Assignee: Convex Computer Corporation, Richardson, Tex.

[21] Appl. No.: 796,745

[22] Filed: Nov. 12, 1985

Related U.S. Application Data

[62] Division of Ser. No. 622,562, Jun. 20, 1984.

[51] Int. Cl.[5] .................... G06F 12/08; G06F 15/347
[52] U.S. Cl. .................................. 364/200; 364/243; 364/243.4; 364/243.41; 364/243.43; 364/243.44
[58] Field of Search ... 364/200 MS File, 900 MS File

[56] References Cited

U.S. PATENT DOCUMENTS

| | | | |
|---|---|---|---|
| 3,866,183 | 2/1975 | Lange | 364/200 |
| 3,896,419 | 7/1975 | Lange et al. | 364/200 |
| 4,070,706 | 1/1978 | Scheuneman | 364/200 |
| 4,169,284 | 9/1979 | Hogan et al. | 364/200 |
| 4,315,312 | 2/1982 | Schmidt | 364/200 |
| 4,370,710 | 1/1983 | Kroft | 364/200 |
| 4,395,763 | 7/1983 | Takahashi | 364/900 |
| 4,439,829 | 3/1984 | Tsiang | 364/200 |
| 4,458,310 | 7/1984 | Chang | 364/200 |
| 4,541,046 | 9/1985 | Nagashima et al. | 364/200 |
| 4,594,682 | 6/1986 | Drimak | 364/200 |

*Primary Examiner*—Gareth D. Shaw
*Assistant Examiner*—Kevin A. Kriess
*Attorney, Agent, or Firm*—Richards, Medlock & Andrews

[57] ABSTRACT

A physical cache unit (100) is used within a computer (20). The computer (20) further includes a main memory (99) a memory control unit (22), inputs/output processors (54, 68) and a central processor (156). The central processor includes an address translation unit (118), an instruction processing unit (126), an address scalar unit (142), a vector control unit (144) and vector processing units (148, 150). The physical cache unit (100) stores operands in a data cache (180), the operands for delivery to and receipt from the control processor (156). Addresses for requested operands are received from the central processor (156) and are examined concurrently during one clock cycle in tag stores (190 and 192). The tag stores (190 and 192) produce tags which are compared in comparators (198 and 200) to the tag of physical addresses received from the central processor (156). If a comparison is made, a hit, both of the requested operands are read, during one clock period, from the data cache (180) and transmitted to the central processor (156). If the requested operands are not in the data cache (180) they are fetched from the main memory (99). The operands requested from the main memory (99) within a block are placed in a buffer (188) and/or transmitted directly through a bypass bus (179) to the central processor (156). Concurrently, the block of operands fetched from main memory (99) may be stored in the data cache (180) for subsequent delivery to the central processor (156) upon request. Further, a block of operands from the central processor (156) can be transmitted directly to the memory control unit 22 and bypass the data cache (180).

2 Claims, 3 Drawing Sheets

CACHE STORE BYPASS FOR COMPUTER

This is a division, of application Ser. No. 622,562, filed June 20, 1984.

TECHNICAL FIELD

The present invention pertains in general to the field of computer technology and in particular to a fast cache unit for storing operands which are supplied to a central processor of a computer.

BACKGROUND ART

A principle objective in the development of computer systems has been to design a computer to produce the maximum processing of operands per unit of cost. In terms of design, this has led to methods and hardware for increasing the speed of execution for instructions as well as to maximizing the throughput of data for the computer system as a whole.

One technique for speeding the execution of operands in a computer is the use of a high speed cache. Such a cache is shown in Kogge, Peter, "The Architecture of Pipelined Computers," McGraw Hill, 1981.

Cache memories have conventionally functioned in the same manner as a main memory with the only difference being a faster access cycle. This approach only takes advantage of the greater speed of the components used in the cache memory.

As a result of the demand for even greater processing speed, there exists a need for circuits and methods of using a cache memory which enhances operating speed by means of the structure and the handling of operands without reliance only on the increased switching speed by component. The present invention provides a physical cache unit and a unique data flow in conjunction with the physical cache unit, such that there is a substantial increase in the rate of operand execution as well as the overall data throughput for the computer.

In a selected embodiment of the present invention, a physical cache unit is provided for a computer which has a main memory and a central processor. A physical cache unit includes a cache store for storing operands therein with the cache store connected to exchange operands with the main memory and the central processor. Circuitry is provided which is responsive to the addresses produced by the central processor for reading operands from the cache store and transferring the operands to the central processor. Further circuitry is provided which is responsive to addresses received from the central processor for transferring operands from the main memory into the cache store and transferring operands between the main memory and the central processor, thereby bypassing the cache store.

BRIEF DESCRIPTION OF THE DRAWINGS

For a more complete understanding of the present invention and the advantages thereof, reference is now made to the following detailed description taken in conjunction with the following drawings in which.

DETAILED DESCRIPTION

Figure 1A:
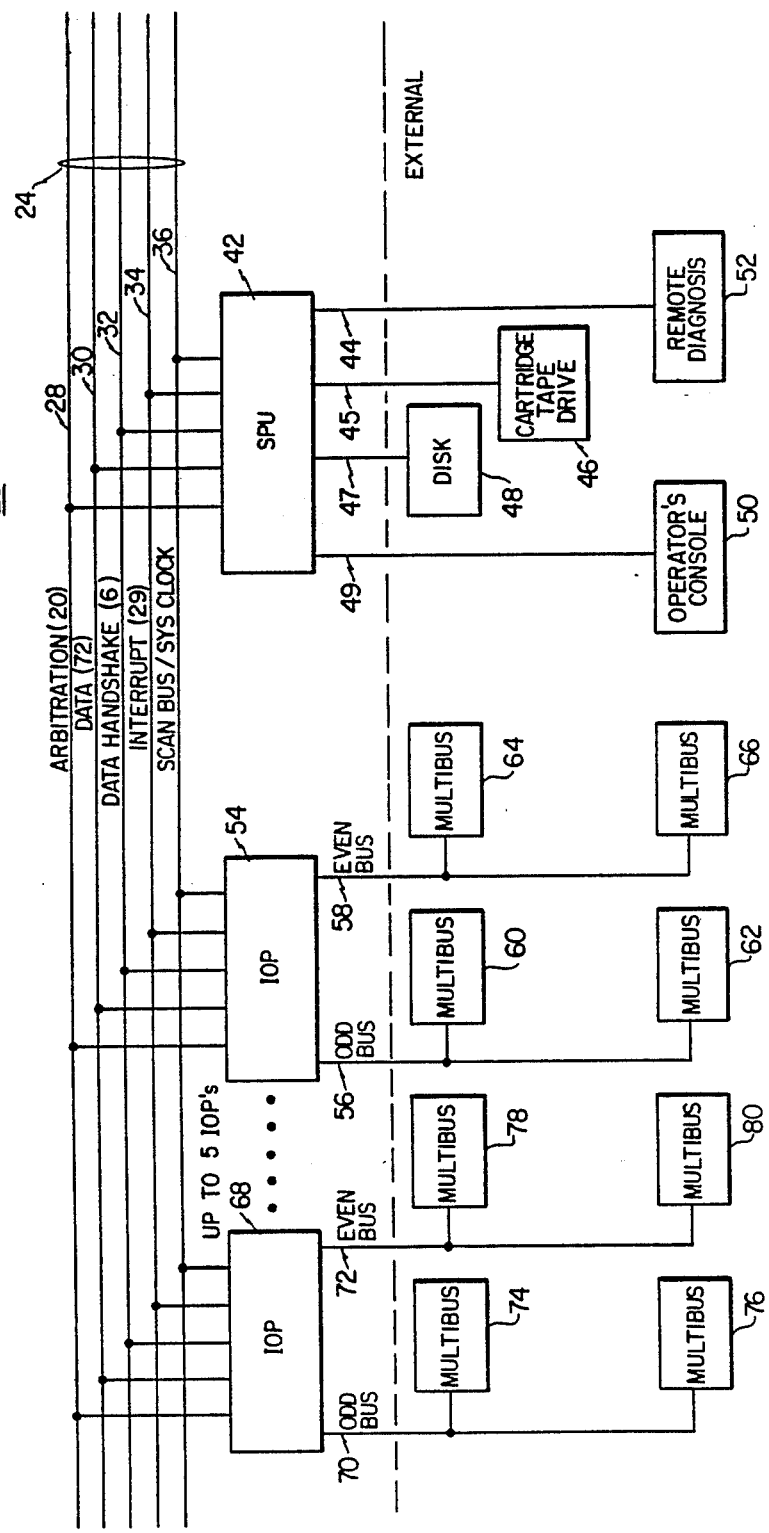
FIGS. 1A and 1B are an overall block diagram illustrating the functional units of a computer which includes the present, invention and the data flow between the functional units.
Figure 1B:
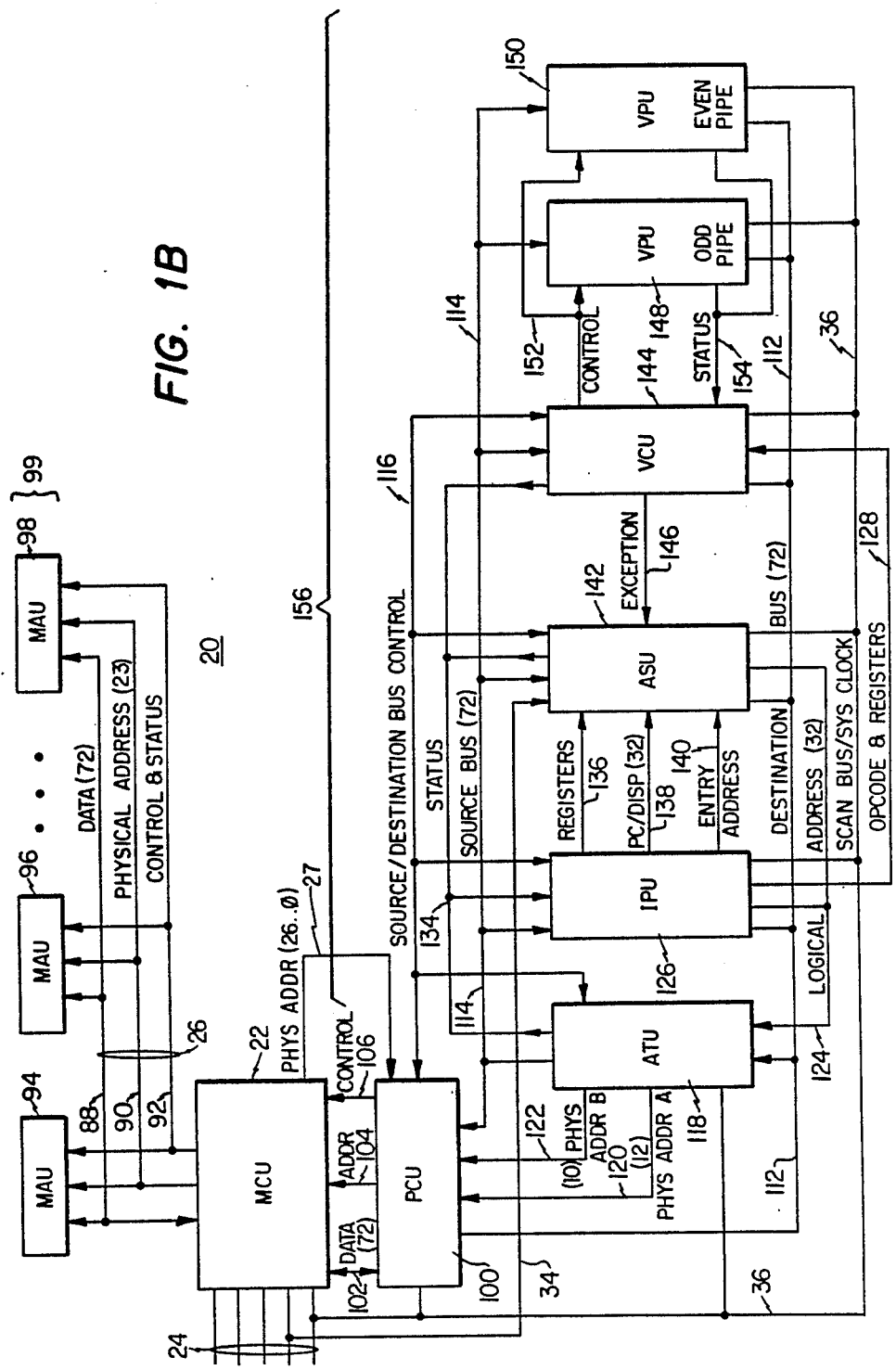

The physical cache unit of the present invention is used in a computer which is designed to maximize data throughput and accelerate data processing in numerous aspects. Referring now to FIGS. 1A and 1B, there is illustrated a functional block diagram for a vector processing computer which is referred to by the reference numeral 20. In a first step of the description, each of the functional blocks is defined together with the basic operand and control flow between the functional blocks. This is followed by an operational description of the computer 20 in reference to the overall block diagram. Following the functional description there is a detailed configuration and operational description for the physical cache unit of the present invention as it is used in the computer 20.

The computer 20 has a hierarchical memory in which operands and instructions are identified at the execution level by logical addresses that can extend over the full range of addresses used within the application program. However, in many instances the actual available physical memory is substantially smaller than the range of logical addresses used in the application program. The addresses used by the main memory and certain caches within the computer 20 are termed physical addresses. Since the logical addresses cover a greater span than the physical addresses, the logical addresses have a greater number of bits to define the address. As described herein there is frequently a requirement to translate logical addresses into corresponding physical addresses. The method of translation and units involved in such translation are described below.

The central element for data flow through the computer 20 is a memory control unit (MCU) 22. A multi-line bus 24 (PBUS) is connected for transmitting and receiving operands, control and other signals with the memory control unit 22. A second multi-line bus 26 (MBUS) is also connected to the memory control unit 22. A physical address line 27 transmits physical addresses from the unit 22 to a physical cache unit described below.

Bus 24 comprises a plurality of lines including an arbitration line 28 (20 bits), a data line 30 (72 bits), a handshake line 32 (6 bits), an interrupt line 34 (29 bits) and a scan bus/system clock line 36. Even though the figures herein show a single line, each line may comprise a plurality of parallel paths, such as, for example, 20 parallel paths for the arbitration line 28.

A service processing unit (SPU) 42 is connected in parallel with each of the lines comprising bus 24. The service processing unit 42 is connected to several units of peripheral equipment which are external to the computer 20. These include a cartridge tape 46 connected through a line 45, and a disk 48 connected through a line 47. Through a pair of RS232 interface lines 44 and 49 there are connected an operator's console 50 and a remote diagnosis unit 52. The service processing unit 42 includes an internal battery backup clock.

At least one input/output processor (IOP) 54 is connected in parallel to the bus 24. The input/output processor 54 provides a plurality of input and output data paths for connecting the computer 20 to peripheral devices such as disk and tape bulk storage. The input-/output processor 54 has an odd bus 56 and an even bus 58. For each of these buses there may be connected thereto a plurality of standard multibus units such as 60 and 62 which are connected to the odd bus 56 and units 64 and 66 which are connected to the even bus 58.

In the system configuration of the computer 20 there may be connected up to, for example, five input/output processors similar to the processor 54. A second such input/output processor is shown by reference numeral 68. Processor 68 has an odd bus 70 and an even bus 72. Multibus units 74 and 76 are connected to the odd bus 70 while multibus units 78 and 80 are connected to the even bus 72.

The bus 26 comprises a plurality of lines including a data line 88 (72 bits), a physical address line 90 (23 bits) and a control and status line 92. The 72 bits for data line 88 comprise 64 bits for operands and 8 bits of parity for error checking and correction. The bus 26 serves to connect the memory control unit 22 to at least one memory array unit 94. Additional memory array units, such as 96 and 98, may be connected in parallel to the bus 26. The computer 20 requires a minimum of one memory array unit and can utilize as many as, for example, 8 memory array units. The set of memory array units 94, 96 and 98 comprises a main memory 99 for the computer 20.

The present invention is embodied within a physical cache unit 100 which comprises a part of the computer 20. The physical cache unit (PCU) 100 is connected to the memory control unit 22 through a data line 102 (72 bits), an address line 104, a control line 106 and the address line 27. The physical cache unit 100 serves principally as a high speed cache memory. The physical cache unit 100 transmits operands to and receives operands from the main memory 99 via the memory control unit 22. Operands are also transmitted from the physical cache unit 100 through a destination bus 112 (72 bits) to a source bus 114 (72 bits). Source bus 114 is also connected to transfer operands into the physical cache unit 100. Control signals for regulating the flow of operands through the source and destination buses is transmitted through a bidirectional source/destination bus control bus 116 which is connected to the physical cache unit 100. Each unit that uses the destination bus 114 or the source bus 112 sends a transfer request and receives a transfer acknowledgement via control line 116. An arbiter circuit in an address translation unit (described below) allocates each bus cycle for the buses 112 and 114 in accordance with a priority for active requests for that cycle.

An address translation unit (ATU) 118 is connected to receive operands from the destination bus 112 and transfer the operands to the source bus 114. The address translation unit 118 produces two physical addresses which are transmitted through a physical address A line 120 (12 bits) and through a physical address B line 122 (10 bits). Both of the lines 120 and 122 are connected to provide physical addresses to the physical cache unit 100. The address translation unit 118 is further connected to the source/destination bus control bus 116. Logical addresses are provided to the address translation unit 118 via a logical address bus 124 (32 bits).

An instruction processing unit (IPU) 126 is connected to both the destination bus 112 and the source bus 114. For control purposes the instruction processing unit 126 is further connected to the source/destination bus control bus 116. Logical addresses generated by the instruction processing unit 126 are transmitted through the logical address bus 124. The instruction processing unit 126 produces opcode instructions together with register information which is transmitted through an opcode and registers bus 128. Status information is provided to the instruction processing unit 126 through a status line 134.

The instruction processing unit 126 further produces register information which is transmitted through a registers line 136, produces a program count (PC) and program count displacement information which is transmitted through a PC/DISP line 138 (32 bits) and produces an entry address which is transmitted through entry address line 140.

An address scalar unit (ASU) 142 principally serves to execute scalar instructions, control vector length and vector stride manipulation, and generate logical addresses. The lines 136, 138 and 140 from the instruction processing unit 126 are input to the address scalar unit 142. Both the destination bus 112 and the source bus 114 are connected to the address scalar unit 142. Interrupt information is further transmitted and received by the address scalar unit 142 through the interrupt line 34. Control information for the source and destination buses is conveyed to and from the address scalar unit 142 through the source/destination bus control bus 116. The address scalar unit 142 further generates status information which is transmitted through the status line 134.

In response to an instruction, the instruction processing unit produces register instructions and an entry address for the address scalar unit 142 together with opcode and register information for a vector control unit (described below).

A vector control unit (VCU) 144 is connected to both the destination bus 112 and the source bus 114 as well as the source/destination bus control bus 116. The vector control unit 144 receives opcode information and register assignments through bus 128 from the instruction processing unit 126. The vector control unit 144 further generates status information which is transmitted through the status line 134. When certain processing problems arise within the vector control unit 144, such as a floating point overflow, an exception command is generated and transmitted through an exception line 146 to the address scalar unit 142.

High speed vector processing of data is carried out in the computer 20 by use of identical vector processing units (VPU) 148 and 150. Unit 148 is termed the odd pipe and unit 150 is termed the even pipe. A vector processing unit appropriate for use in the present invention is described in the reference to Kogge above. Both the destination bus 112 and the source bus 114 are connected to the vector processing units 148 and 150 for receiving and transmitting operands. The vector control unit 144 produces control commands which are transmitted through a control line 152 to both of the vector processing units 148 and 150. Status information is produced by both of the units 148 and 150 and the status information is transmitted through a status line 154 to the vector control unit 144.

The scan bus/system clock line 36 originates in the service processing unit 42 and extends for connection to each of the input/output processors, such as 54 and 68, the memory control unit 22, the physical cache unit 100, the address translation unit 118, the instruction processing unit 126, the address scalar unit 142, the vector control unit 144, and the vector processing units 148 and 150. The service processing unit 42 transmits the system clock through line 36 to synchronize the operation of each of the units in computer 20. Unit 42 also operates through line 36 to diagnose the operation of each of the units connected to line 36.

The collection of units comprising the address translation unit 118, the instruction processing unit 126, the address scalar unit 142, the vector control unit 144 and the vector processing units 148 and 150 is termed the central processor for the computer 20 and is designated by the reference numeral 156. However, the data cache located in the address translation unit 118 serves as a memory and is therefore not necessarily a part of the central processor 156.

The basic operation of the computer 20 is now described in reference to FIGS. 1A and 1B to illustrate overall processing and operand flow and to show the interrelationship of the physical cache unit 100 with respect to the other units of the computer 20. Following this general operational description, a specific description of the physical configuration and function is presented for the physical cache unit 100.

The first step in the operation of the computer 20 is termed initialization. When power is first turned on, there is no valid data or instructions in any of the memory locations or registers of the computer 20.

The initialization of the computer 20 is carried out by the service processing unit 42. In a first step the various registers and status bits throughout the computer 20 are set to an initial state to eliminate the random status that occurs during powerup.

In the next step a command is input through the operator's console 50 to transfer the operating system for the central processor 156 from the disk 48 into the main memory 99, which includes the memory array units 94, 96 and 98. The operating system travels from the disk 48 through the service processing unit 42, the bus 24 and the memory control unit 22 into the main memory 99.

As a further step in the initialization process, microcode is loaded into random access memory (RAM) in various control stores within the central processor 156, specifically into control stores in the address scalar unit 142 and the vector control unit 144. After the initialization and the loading of the operating system, the service processing unit 42 initiates instruction execution in the central processor 156. This is accomplished by setting the program counter, which is within the instruction processing unit 126, to a preselected program count. This starts the program execution.

As the first step in operation, the instruction processing unit 126 seeks the first instruction to execute. An instruction cache is provided within the instruction processing unit 126. Since the required instruction cannot be in this cache, because the computer 20 has just been initialized, a request must be made to main memory 99 for the instruction. The instruction processing unit 126 generates a request to main memory by supplying a logical address through the logical address bus 124. The logical address produced by unit 126 is transmitted via bus 124 to the address translation unit 118 which produces the corresponding physical address. The resulting physical address is transmitted through line 120 to the physical cache unit 100. If the requested instruction at the specified physical address is not within the physical cache unit 100, the physical address is passed through line 104 to the memory control unit 22. The physical address is then passed to the main memory 99 where the desired instruction is retrieved, typically within a block of instructions, and passed through the data line 88, the memory control unit 22, data line 102, and into the physical cache unit 100. The block of instructions thus produced are passed through the physical cache unit 100, the destination bus 112, through the address translation unit 118 to the source bus 114. From bus 114 the instructions are delivered to the instruction processing unit 126 where the requested instructions are stored within an instruction cache. The desired instruction is then decoded where it initiates either the address scalar unit 142 or the vector control unit 144 or both to carry out the steps of the selected instruction.

The above example is typical for the fetching of an instruction. A description is now presented for the execution of a load scalar instruction. The primary decoding is carried out by the instruction processing unit 126. As a result of the decoding, register information concerning the use of the registers within the address scalar unit 142 is transmitted over the registers line 136. The load instruction requires retrieving information from either main memory 99 or physical cache unit 100 or the logical cache in unit 126. A logical address is generated by the address scalar unit 142. This address may be the contents of an "A" register, the contents of an instruction stream literal, or may be the arithmetic sum of the two. A logical address is directed from the instruction processing unit 126 through the logical address bus 124 to the address translation unit 118 which produces a corresponding physical address. This physical address is transmitted through lines 120 or 122 to the physical cache unit 100. During the clock cycle in which the logical address is being translated to a physical address and transferred to the physical cache unit 100, a logical data cache within the address translation unit 118 is accessed. If the logical cache contains the requested operands, then that operand is transferred to the address scalar unit 142 during the clock cycle in which the logical to physical translation occurs, and the physical memory request is aborted. If the operand is not contained within a logical cache and operands for the requested address are stored within the physical cache unit 100, they are immediately retrieved from the cache unit 100 and transmitted through the destination bus 112, through the address translation unit 118 to the source bus 114 for delivery to the address scalar unit 142 into the selected registers.

If the requested data is not in the physical cache unit 100, the physical address is passed through the memory control unit 22 to the main memory 99 where the desired operands are read and returned through the memory control unit 22, the physical cache unit 100 to the destination bus 112, through the address translation unit 118 to the source bus 114 for delivery to the address scalar unit 142. Within the address scalar unit 142 the retrieved information is processed as required by the executed instruction.

Figure 2:
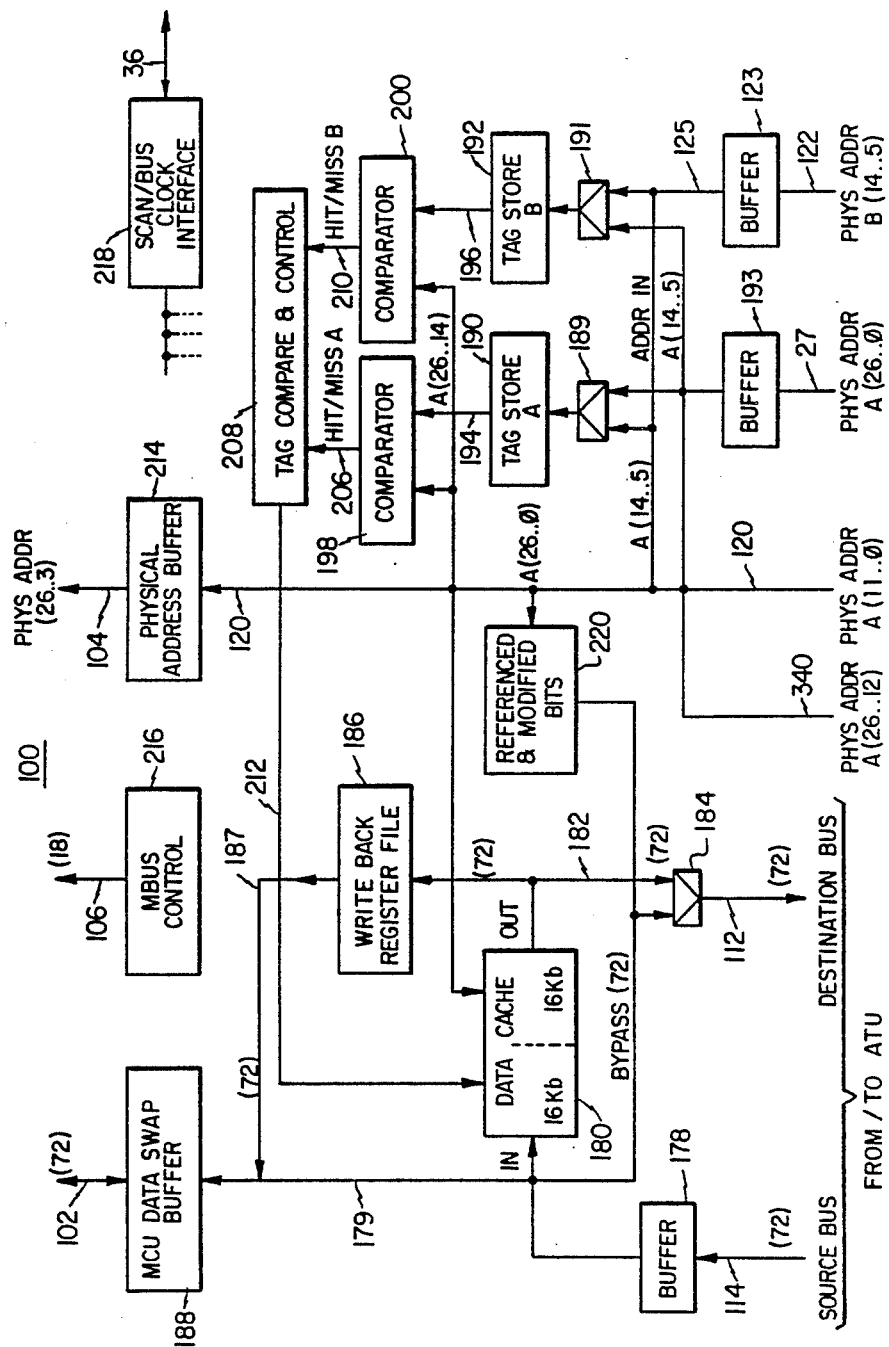
FIG. 2 is a functional block diagram for the physical cache unit cache store and bypass of the present invention.

The physical cache unit 100 of the present invention, shown in FIG. 1B, is described in a detailed block diagram in FIG. 2. The source bus 114 is connected to transfer operands into a buffer 178 which in turn transfers the operands to an internal bus 179 (72 bits) which is connected to the input of a data cache 180. Data cache 180 comprises two independently operable 16Kb caches, further described below. Thus, cache 180 has a total capacity of 32Kb. The output from the cache 180 is transmitted through a bus 182 (72 bits) to the first input of a switch 184. The second input to the switch 184 is connected to the internal bus 179. The output of the switch 184 is connected to the destination bus 112. A write back register file 186 is connected between the bus 182 and a unidirectional bus 187 (72 bits) which provides data into bus 179. When new data is to be written into the cache 180, the previous data in the cache, if it has been altered since it was received from the main memory 99, is transferred to the write back register file 186 and is subsequently transferred through line 102 and the memory control unit 22 for writing into the main memory 99.

An MCU data swap buffer 188 is connected to send and receive operands through the line 102 which is in turn connected to the memory control unit 22. The buffer 188 is also connected to transmit and receive operands with the internal bus 179. The purpose of the MCU data swap buffer 188 is to (a) provide a connection from the bidirectional line 102 to the bidirectional internal bus 179 and (b) rotate nonaligned longwords by swapping halves of 64 bit words. A longword is defined herein to be 64 bits, a word is 32 bits and a byte is 8 bits.

The physical address A line 120, carrying address bits 11..0 is connected to the first inputs of two switches 189 and 191 which have the outputs thereof connected to respective tag stores 190 and 192. Store 190 is labeled "Tag Store A" and store 192 is labeled "Tag Store B". The tag stores 190 and 192 are physically identical and contain the same stored tags and tag indexes. The physical address B line 122, which conveys physical address bits 14..5, is connected through a buffer 123 to a second input of the switch 191. Line 340 provides physical address bits 26..12 to line 120. Line 27 provides a physical address from the memory control unit 22 through a buffer 193 to switches 189 and 191. Line 340 provides a physical page address from the address translation unit 118.

The physical address transmitted through lines 120, 122 and 27 includes two sections which are termed tag and tag index. The tag index portion is input to the tag stores 190 and 192 to produce corresponding tags which indicates the unique address for data in the data cache 180. The tags produced by the stores 190 and 192 are transmitted respectively through lines 194 and 196 to comparators 198 and 200. The tag portion of the physical address, bits 26..14, through line 120 is also input to the comparators 198 and 200. Within the comparator 198 the tag received through line 120 is compared to the tag produced by the store 190. If the two tags compare, there is produced a "hit" response which is transmitted through a line 206 to a tag compare and control unit 208. If the tags do not compare, it is deemed a "miss" and this response is transmitted through line 206 to unit 208.

Likewise, the comparator 200 compares the tag received through line 120 with the tag produced by store 192. A hit or miss response is transmitted through a line 210 to the tag compare and control unit 208. If a hit is produced by either of the comparators 198 or 200, a response is transmitted through a line 212 to the data cache 180. The tag index is input to the data cache 180 from line 120. The data at the stored location of the tag index is read from the cache 180 and transmitted through bus 182 and switch 184 to the destination bus 112 for delivery to the central processor unit 156.

The physical address A line 120 is further connected to a physical address buffer 214. If a miss is produce by the comparators 198 and 200, the physical address received through line 120 is stored in buffer 214 and then further transmitted through line 104 to the memory control unit 22 to retrieve the desired operands from the main memory 99. The operands thus read from the main memory 99 are returned through the memory control unit 22 through the data line 102, to the internal bus 179 and directly routed through the switch 184 to the destination bus 112 for delivery to the central processor 156. At the same time, the fetched block of operands from main memory 99 is transferred into the data cache 180 for storage at the tag index location corresponding to the physical address for the operands in main memory. In previous data caches, the technique has been to return the operands into the data cache and then read them out of the data cache back to the central processor. However, by use of the direct bypass via internal bus 179 to the switch 184, considerable time is saved thereby increasing the speed of retrieval when there is a miss in attempting to retrieve data from the cache 180. Also, by bypassing the cache 180, data that was previously contained within the cache 180 is not overwritten or flushed back to main memory 99. This further enhances performance by effectively enhancing the cache size without a physical increase in the size of the cache 180.

The physical cache unit 100 further includes an MBUS control 216 which is connected to the control line 106 for monitoring the control and transfer of operands between the memory control unit 22 and the physical cache unit 100. A scan/bus clock interface 218 is connected t the scan/bus system clock line 36 to receive the system clock signal together with diagnostic commands produced by the service processing unit 42. The interface 218 is connected to numerous parts of the physical cache unit 100 to provide synchronization and diagnostics.

The physical cache unit 100 further includes a referenced and modified bits unit 220 which receives a physical address from line 120 and transfers operands to the internal bus 179. The purpose of unit 220 is to record read and write reference patterns as they apply to a pageframe. A pageframe is 4096 bytes stored in main memory. The operating system subsequently uses these bits to control page replacement algorithms, which are used in virtual memory management.

The computer 20 is a synchronous machine which operates at a clock rate of, for example, 100 nanoseconds for a major clock cycle and 50 nanoseconds for a minor clock cycle. The physical address A line 120 and physical address B line 122, during the same major cycle, input different addresses to the tag stores 190 and 192. The data cache 180 is designed to operate at double the rate of the major cycle of the system clock, that is, retrieve each operand in 50 nanoseconds. Since the tag stores 190 and 192 are operating in parallel and the cache 180 is operating at double the clock rate, two operands are retrieved from the data cache 180 during each major clock cycle. This substantially increases the rate of retrieving data from the physical cache unit 100. In a selected embodiment of the computer 20, two 32 bit words can be retrieved during each major cycle and transmitted through the destination bus 112, therefore effectively having the capability of retrieving a 64 bit word during each major cycle. The production of the two operands is particularly advantageous with the use of the even and odd vector processing units 148 and 150 which have alternate receipt of data elements of vectors.

The physical cache unit 100 principally serves the function of rapidly supplying data operands to the central processor 156 from the data cache 180. When the required operands are in the data cache 180 the operands are supplied to the central processor 156 much faster than retreiving the operands from the relatively slow main memory 99. The operands requested by the central processor 156 are requested as physical addresses which are produced by the address translation unit 118. These physical addresses are transmitted through lines 120 and 122. During one major clock cycle these addresses are input to the tag stores 190 and 192. These tag stores contain identical information and are provided as a pair such that two addresses can be processed during one major clock cycle. An index portion of each of the addresses is provided to the tag stores 190 and 192 and this index is compared with indexes previously stored in the tag stores 190 and 192. For each index there is a corresponding operand or group of operands in the data cache 180. If an index match is made, a corresponding tag is produced by the tag stores, either 190 or 192, and the index is transmitted to the respective comparator, 198 or 200. During the same major clock cycle the tag portion of the physical address is transmitted through line 120 to the comparators 198 and 200. If the tag produced from the tag store and the tag from the address match, then the requested operands are located in the data cache 180. When there is a match, a hit, the control unit 208 causes the corresponding operands in the data cache 180 to be read out and transmitted through bus 182 to the switch 184 which routes the operands to distination bus 112. The operands thus produced are routed through the address translation unit 118 to the source bus 114, which supplies the operands to the appropriate unit within the central processor 156. The operands are typically supplied to either the address scalar unit 142 or the vector processing units 148 and 150.

A unique feature of the physical cache unit 100 is the combination of the identical tag stores 190 and 192 which process two operand requests during one major clock cycle and operate in conjunction with the data cache 180 which is sufficiently fast to produce two operands during one major clock cycle. This cooperation of elements serves to double the effective rate of producing operands as compared to a conventional synchronous computer cache which produces one operand per clock cycle.

A miss response produced by the comparators 198 and 200 indicates that the requested operand is not stored in the data cache 180. In this case, the operands must be fetched from the main memory 99. The physical address for the requested operand is transmitted to the physical address buffer 214. This address is in turn passed through line 104 to the memory control unit 22 which functions to retrieve the desired operands from the main memory unit 99. Typically, a block of operands is fetched from the main memory during each request cycle. For example, four longwords as a block may be read from the main memory 99 during each memory cycle. This block of operands is transmitted through the data line 88 to the memory control unit 22 and then through the data line 102 into the buffer 188. This block of operands is next transmitted through the internal bus 179. At this point, the operands are handled in an unique manner. In previous cache units, it has been the conventional practice to store the retrieved block of operands in the data cache, read the desired operand from the data cache and then supply it to the requesting unit. This process of storing and reading adds substantial time to the period from initial request to supplying of the operand to the requesting unit. In the physical cache unit 100 in accordance with the present invention, the operands fetched from main memory 99 are transmitted in a bypass fashion around the data cache 180 to the switch 184 and placed on the destination bus 112 rather than being read from the data cache 180. At the same time, for a scalar request, the block of operands are being stored within the data cache 180, since the remainder of the operands in the block will likely be requested in upcoming cycles by the central processor 156. If a vector request is made for providing operands to the vector processing units 148 and 150, the block totally bypasses the cache 180 and there is no store. Block bypass is applicable for both reading from main memory 99 and for writing into main memory 99. In reading from main memoy 99, data passes through bus 102 and buffer 188 to bus 179, through switch 184 to destination bus 112. In writing into main memory 99, a block of data originates on bus 114, (source bus) is buffered in buffer 178, placed on bypass 179, buffered in buffer 188 and placed on bus 102 to the memory control unit 22. The memory control unit 22 performs the necessary functions to write this data block into memory array units 94, 96, . . . , 98 (part of the overall main memory 99). This technique of bypassing the data cache 180 to supply operands that have been immediately requested further increases the speed of operation of the computer 20.

The data cache 180 is filled on demand. That is, a block of operands is read from the main memory 99 when a miss response is produced by either of the comparators 198 or 200.

The physical cache unit 100 can also supply operands to input/output processors, such as 54 and 68. When an operand request is received by the memory control unit 22 from a peripheral device, a duplicate of the tag stores 190 and 192 is checked within the memory control unit 22. The duplicate tag store in the memory control unit 22 indicates the operands that are stored in the data cache 180. If the requested operand is stored within the data cache 180, the physical address is transmitted through line 27 to the buffer 193 and through the switches 189 and 191 to the tag stores 190 and 192. The requested operand is then fetched from the data cache 180 and conveyed back to the memory control unit 22 which returns the operand to main memory where it is then read by the requester in a read cycle. The requested operand travels from the cache 180 through bus 187, buffer 188, bus 102 to memory control unit 22.

A further aspect of the present invention is the operation of cache 180 with a graceful degradation mode. As noted above, cache 180 comprises two 16Kb caches which can be operated independently. A tag index provided to the cache 180 comprises bits 26..12. A 32Kb cache requires 15 bits of address. 16Kb memory requires only 14 bits. However, the full 15 bits are always provided to the data cache 180. One address bit is utilized to select one of the two 16K bit halves of the data cache 180. If either half of the data cache 180 becomes defective, the computer 20 can be reinitialized with the operator designating which half of the data cache 180 is to be used. In this mode the selection bit for the two halves of the data cache is not used. The use of this mode makes it possible to continue operation of the computer 20 but with some reduced capabilities. This is much more desirable than totally ceasing operation of the computer 20 which would be the case if there were any failure of the cache 180 and it were not possible to deallocate one half of the cache 180.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope of the invention.

What we claims is:

1. A physical cache unit for a computer having a main memory and central processor and which utilizes both scalar and vector operands, comprising: 'a cache store for storing only said scalar operands therein,
   first bus means for transferring operands between said cache store and said main memory,
   second bus means for transferring operands between said cache store and said central processor,
   bidirectional bus bypass means for transferring operands between said main memory and said central processor by bypassing said cache store,
   means responsive to addresses produced by said central processor for reading scalar operands from said cache store and for transferring said scalar operands through said second bus means to said central processor; and responsive to addresses received from said central processor for transferring said scalar operands from said main memory through said first bus means into said cache store when operands having said addresses are not present in said cache store, and
   said bidirectional bus bypass means for transferring both said scalar and said vector operands in both directions between said main memory and said central processor for bypassing said cache store when vector operands are requested by said central processor or when scalar operands requested by said central processor are not present in said cache store.

2. A method for transferring operands between a main memory and a central processor of a computer, comprising the steps of:
   generating an address for either a selected scalar or a selected vector operand which is required by said central processor,
   comparing the address of said selected scalar operand to addresses of operands stored in a cache store, wherein said cache store is connected to transfer operands to and from said main memory and to and from said central processor and said cache store has only said scalar operands stored therein,
   transferring said selected scalar operand from said cache store to said central processor when the address of said selected scalar operand compares to the address of an operand stored in the cache store,
   transferring said selected scalar operand from said main memory to said central processor without intermediate storage in said cache store thereby bypassing said cache store when the address of said selected scalar operand does not compare to the address of any operands stored in said cache store,
   storing said selected scalar operand in said cache store after transfer to said central processor, and
   transferring said selected vector operand from said main memory to said central processor upon generation of said address for said selected vector operand wherein said selected vector operand bypasses said store in route to said central processor.

* * * * *